United States Patent
Moon et al.

(10) Patent No.: US 9,142,823 B2
(45) Date of Patent: Sep. 22, 2015

(54) RECHARGEABLE BATTERY AND MODULE OF THE SAME

(71) Applicant: SAMSUNG SDI CO., LTD., Yongin-si, Gyeonggi-do (KR)

(72) Inventors: Jong-Seok Moon, Yongin-si (KP);
Hui-Jun Lee, Yongin-si (KR);
Joong-Heon Kim, Yongin-si (KR);
Hee-Sang Nam, Yongin-si (KR)

(73) Assignee: SAMSUNG SDI CO., LTD., Yongin-si, Gyeonggi-do (KR)

(*) Notice: Subject to any disclaimer, the term of this patent is extended or adjusted under 35 U.S.C. 154(b) by 115 days.

(21) Appl. No.: 13/873,511

(22) Filed: Apr. 30, 2013

(65) Prior Publication Data

US 2014/0147729 A1  May 29, 2014

(30) Foreign Application Priority Data

Nov. 23, 2012  (KR) .................. 10-2012-0133991

(51) Int. Cl.
*H01M 2/20* (2006.01)
*H01M 2/30* (2006.01)
*H01M 10/04* (2006.01)

(52) U.S. Cl.
CPC .............. *H01M 2/204* (2013.01); *H01M 2/202* (2013.01); *H01M 2/206* (2013.01); *H01M 2/30* (2013.01); *H01M 10/0413* (2013.01); *H01M 10/0431* (2013.01); *H01M 2/305* (2013.01)

(58) Field of Classification Search
CPC .............................. H01M 2/202; H01M 2/305
USPC .................................................. 429/158, 179
See application file for complete search history.

(56) References Cited

U.S. PATENT DOCUMENTS

| 2010/0173178 | A1 | 7/2010 | Kim et al. |
| 2010/0216008 | A1* | 8/2010 | Yoon .............................. 429/158 |
| 2010/0227212 | A1 | 9/2010 | Kim |
| 2010/0266889 | A1 | 10/2010 | Kim |
| 2011/0064993 | A1 | 3/2011 | Ochi |
| 2013/0095374 | A1* | 4/2013 | Kim .............................. 429/179 |

FOREIGN PATENT DOCUMENTS

| EP | 2 393 144 A1 | 2/2010 |
| EP | 2 453 500 A1 | 5/2012 |
| JP | 2008-098012 A | 4/2008 |
| JP | 2008-181765 A | 8/2008 |

(Continued)

OTHER PUBLICATIONS

Extended European Search Report dated May 30, 2014.

(Continued)

*Primary Examiner* — Cynthia H Kelly
*Assistant Examiner* — Monique Wills
(74) *Attorney, Agent, or Firm* — Lee & Morse, P.C.

(57) ABSTRACT

A rechargeable battery includes an electrode assembly that performs charging and discharging, a case in which the electrode assembly is located, a cap plate coupled to an opening of the case, and electrode terminals located in the cap plate and insulated from the cap plate by insulation members located at terminal holes of the cap plate, the electrode terminals being connected to electrodes of the electrode assembly and extending outside the cap plate and the electrode terminals including a fastening portion that receives at least a part of a bus bar to be welded.

10 Claims, 11 Drawing Sheets

(56) References Cited

FOREIGN PATENT DOCUMENTS

| | | |
|---|---|---|
| JP | 2010-061961 A | 3/2010 |
| KR | 10-2010-0081508 | 7/2010 |
| KR | 10-2010-0099596 | 9/2010 |

OTHER PUBLICATIONS

Partial European Search Report dated Feb. 27, 2014.

\* cited by examiner

FIG. 11

RECHARGEABLE BATTERY AND MODULE OF THE SAME

CROSS-REFERENCE TO RELATED APPLICATION

This application claims priority to Korean Patent Application No. 10-2012-0133991 filed in the Korean Intellectual Property Office on Nov. 23, 2012 and entitled: "RECHARGEABLE BATTERY AND MODULE OF THE SAME," the entire contents of which are incorporated herein by reference.

BACKGROUND

1. Field

The present description relates to a rechargeable battery and a module of the same.

2. Description of the Related Art

A rechargeable battery is a battery that repeatably performs charging and discharging, unlike a primary battery. A small capacity rechargeable battery may be used in a portable and small electronic device, such as a mobile phone, a notebook computer, or a camcorder. A large capacity rechargeable battery may be used as a power source for driving a motor of a hybrid car and an electric car.

For example, the rechargeable battery includes an electrode assembly that charges and discharges, a case for accommodating the electrode assembly, a cap plate coupled to an opening of the case, and an electrode terminal installed in the cap plate to be electrically connected to the electrode assembly.

SUMMARY

Embodiments are directed to a rechargeable battery including an electrode assembly that performs charging and discharging, a case in which the electrode assembly is located, a cap plate coupled to an opening of the case, and electrode terminals located in the cap plate and insulated from the cap plate by insulation members located at terminal holes of the cap plate, the electrode terminals being connected to electrodes of the electrode assembly and extending outside the cap plate and the electrode terminals including a fastening portion that receives at least a part of a bus bar to be welded.

Each electrode terminal of the electrode terminals may be in a form of a band having a width and a thickness, each electrode terminal being welded to an uncoated portion of the electrode assembly inside the case by welding, and each electrode terminal including the fastening portion outside the case.

The fastening portion may include a concave recess open toward one side of the electrode terminal in a width direction.

The electrode terminals may include a negative electrode terminal connected to a negative electrode of the electrode assembly and including a negative electrode terminal concave recess and a positive electrode terminal connected to a positive electrode of the electrode assembly and including a positive electrode terminal concave recess. The negative electrode terminal concave recess may be opened toward an external side of the negative electrode terminal in the width direction, and the positive electrode terminal concave recess may be opened toward an external side of the positive electrode terminal in the width direction.

The electrode terminals may include a negative electrode terminal connected to a negative electrode of the electrode assembly and including a negative electrode terminal concave recess and a positive electrode terminal connected to a positive electrode of the electrode assembly and including a positive electrode terminal concave recess. The negative electrode terminal concave recess may be open toward an internal side of the negative electrode terminal in a width direction. The positive electrode terminal concave recess may be open toward an external side of the positive electrode terminal in a width direction.

The fastening portion may include a through-opening that passes through a center of the electrode terminal in a width direction.

Each of the insulating members may include a synthetic resin that is molded such that a respective one of the electrode terminals is spaced apart from an inside of a respective one of the terminal holes.

Embodiments are also directed to a rechargeable battery module, including a plurality of unit cells of rechargeable batteries, each of the unit cells including electrode terminals protruding outside of a cap plate, and a bus bar connecting the electrode terminals of adjacent ones of the unit cells. Each of the electrode terminals include a fastening portion located at an outside the cap plate. At least a part of the bus bar is in an inserted state in the fastening portion of each of the electrode terminals to be welded.

Each of the electrode terminals may be in a form of a band having a width and a thickness. Each electrode terminal may be welded to an uncoated portion of an electrode assembly inside a case. Each of the electrode terminals may include the fastening portion outside the case.

Each fastening portion may include a first concave recess opened toward one side of the electrode terminal in a width direction. The bus bar may be coupleable to the first concave recess to be welded.

The electrode terminals of each of the unit cells may include a negative electrode terminal connected to a negative electrode of the electrode assembly and including a negative electrode terminal first concave recess and a positive electrode terminal connected to a positive electrode of the electrode assembly and including a positive electrode terminal first concave recess. The negative electrode terminal first concave recess may be opened toward an external side of the negative electrode terminal in the width direction. The positive electrode terminal first concave recess may be opened toward an external side of the positive electrode terminal in the width direction. The bus bar may include second concave recesses that are coupleable with the negative electrode terminal first concave recess of one of the unit cells and the positive electrode terminal first concave recess of another one of the unit cells.

The electrode terminals of each of the unit cells may include a negative electrode terminal connected to a negative electrode of the electrode assembly and including a negative electrode terminal first concave recess and a positive electrode terminal connected to a positive electrode of the electrode assembly and including a positive electrode terminal first concave recess. The negative electrode terminal first concave recess may be opened toward an internal side of the negative electrode terminal in the width direction. The positive electrode terminal first concave recess may be opened toward an external side of the positive electrode terminal in the width direction. The bus bar may include a second external concave recess coupleable with the negative electrode terminal first concave recess of one of the unit cells and a second internal concave recess coupleable with the positive electrode terminal first concave recess of another one of the unit cells.

Each fastening portion may include a through-opening passing through a center of the electrode terminal in a width direction. The bus bar may be insertable in the through-opening.

The electrode terminals of each unit cell may include a negative electrode terminal connected to a negative electrode of the electrode assembly and including a negative electrode terminal concave recess and a positive electrode terminal connected to a positive electrode of the electrode assembly and including a positive electrode terminal concave recess. The bus bar may include a first portion formed of a same material as that of the negative electrode terminal and connectable to the negative electrode terminal of one of the unit cells, and a second portion formed of a same material as that of the positive electrode terminal and connectable to the positive electrode terminal of another one of the unit cells. The first portion and the second portion may be connected by clad welding.

BRIEF DESCRIPTION OF THE DRAWINGS

Features will become apparent to those of skill in the art by describing in detail exemplary embodiments with reference to the attached drawings in which.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. Like reference numerals refer to like elements throughout.

Figure 1:
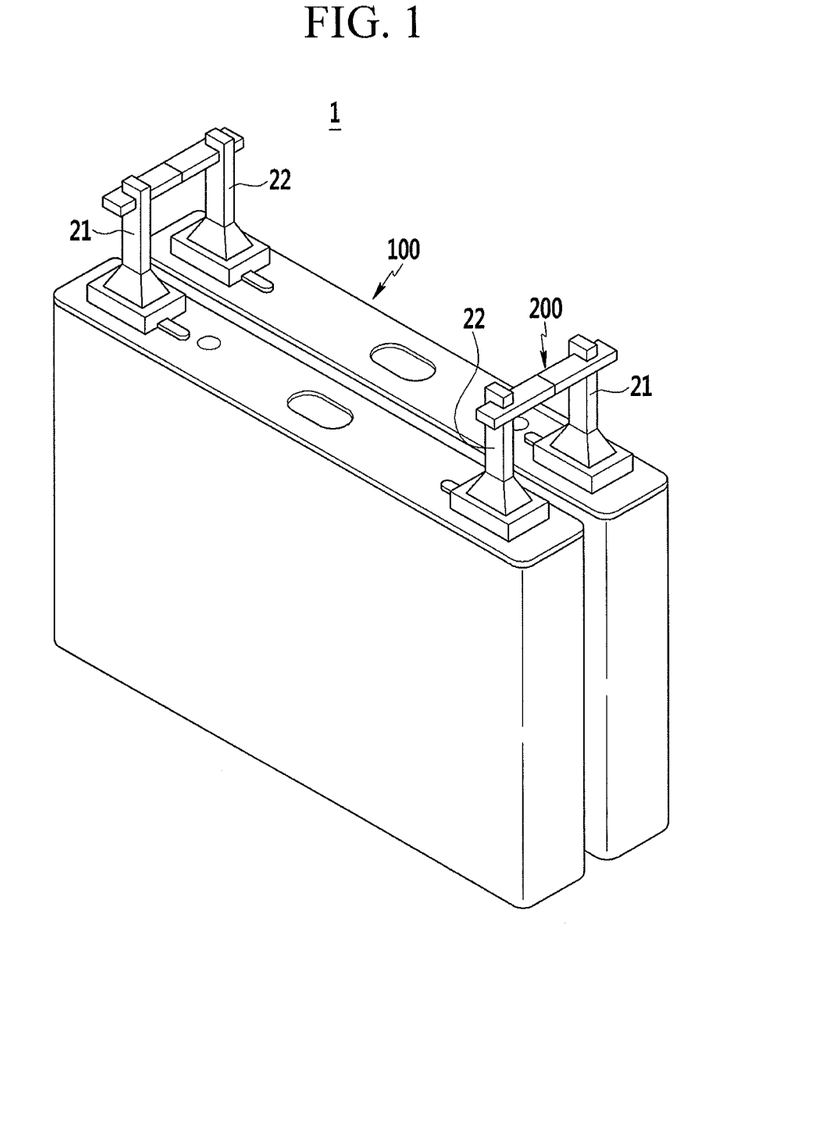
FIG. 1 illustrates a perspective view of a rechargeable battery module according to an exemplary embodiment.

FIG. 1 is a perspective view of a rechargeable battery module 1 according to an exemplary embodiment. Referring to FIG. 1, the rechargeable battery module 1 according to this embodiment includes unit cells 100 of rechargeable batteries, and bus bars 200 for electrically connecting the plurality of unit cells 100. In the battery module 1, unit cells 100 may be coupled by the bus bars 200 in series, in parallel, or in a combination thereof.

Figure 2:
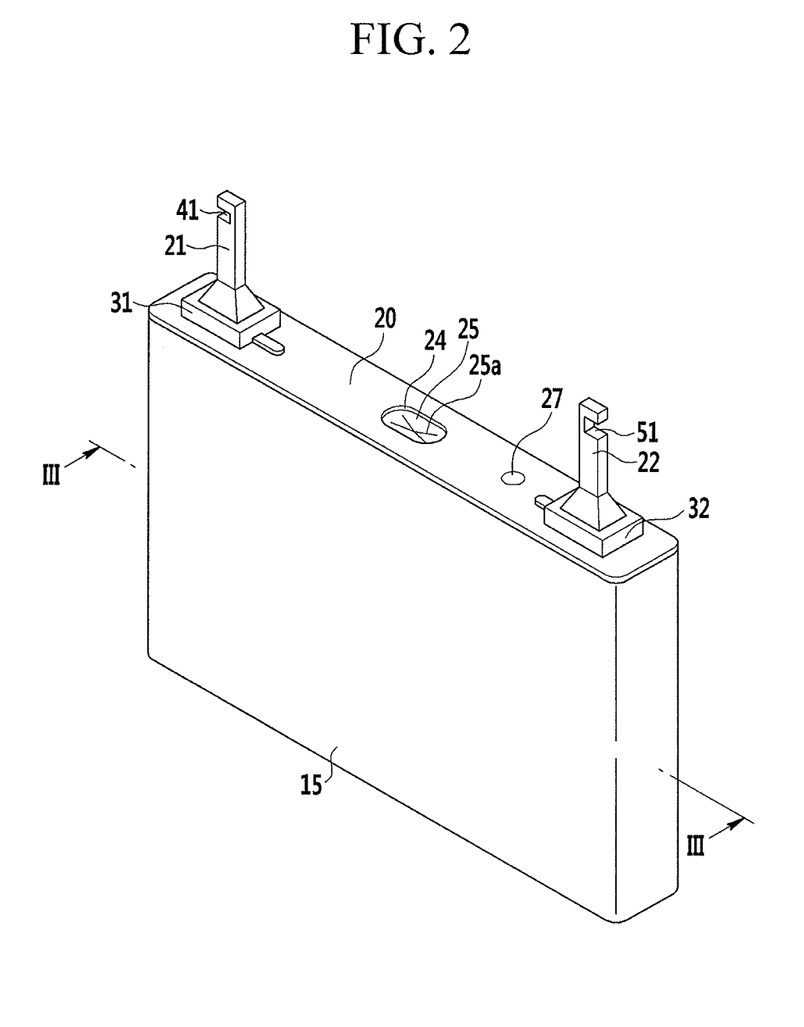
FIG. 2 illustrates a perspective view of a unit cell applied to FIG. 1.
Figure 3:
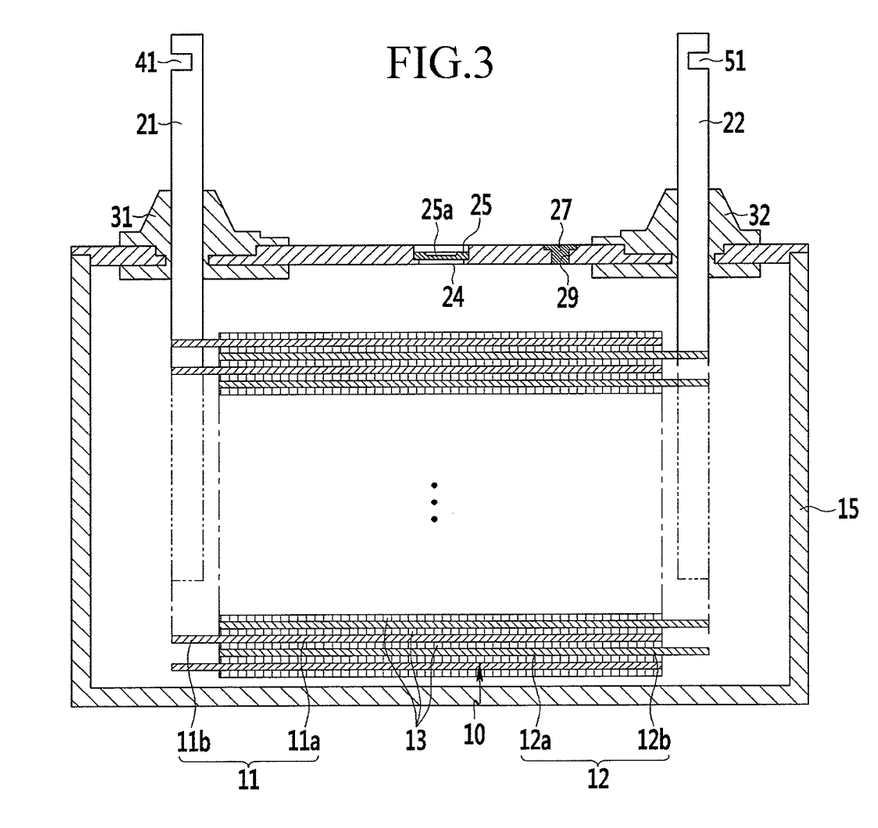
FIG. 3 illustrates a cross-sectional view taken along line III-III of FIG. 2.

FIG. 2 is a perspective view of one of the unit cells of FIG. 1, and FIG. 3 is a cross-sectional view taken along line of FIG. 2. Referring to FIGS. 2 and 3, the rechargeable battery forming the unit cell 100 includes an electrode assembly 10 for charging and discharging current, a case 15 in which the electrode assembly 10 is accommodated, a cap plate 20 coupled to an opening of the case 15, and electrode terminals (for example, negative and positive electrode terminals 21 and 22) installed in the cap plate 20 to be connected to the electrode assembly 10.

For example, the electrode assembly 10 may be formed by arranging electrodes (for example, a negative electrode 11 and a positive electrode 12) on both surfaces of a separator 13 that is an insulator, and winding the negative electrode 11, the separator 13, and the positive electrode 12 in a jelly-roll state.

The negative electrode 11 and the positive electrode 12 may include coated portions 11a and 12a formed by coating an active material onto a current collector of a metal plate, and uncoated portions 11b and 12b formed as current collectors that, because the active material is not coated thereon, are exposed.

The uncoated portion 11b of the negative electrode 11 is formed at one end of the negative electrode 11 along the wound negative electrode 11. The uncoated portion 12b of the positive electrode 12 is formed at the other end of the positive electrode 12 along the wound positive electrode 12. The uncoated portions 11b and 12b are disposed at both ends of the electrode assembly 10, respectively.

The case 15 may be formed in an approximately cuboid shape so as to provide a space for accommodating the electrode assembly 10 therein. The opening of the case 15 may be formed at one side of the cuboid to permit the electrode assembly 10 to be inserted into an internal space from the outside.

The cap plate 20 is installed at the opening of the case 15 to seal the case 15 accommodating the electrode assembly 10. For example, the case 15 and the cap plate 20 may be formed of aluminum, so that the case 15 and the cap plate 20 may be welded to each other at the opening.

Further, the cap plate 20 may include one or more openings, and may include, for example, an electrolyte injection opening 29, a vent hole 24, and terminal holes H1 and H2.

The electrolyte injection opening 29 permits the electrolyte to be injected into the case 15 after the cap plate 20 is coupled to the case 15. After the injection of the electrolyte, the electrolyte injection opening 29 may be sealed with a sealing stopper 27.

The vent hole 24 may be sealed with a vent plate 25 so as to discharge internal pressure and generated gas of the unit cell 100. When the internal pressure of the unit cell 100 reaches a predetermined pressure, the vent plate 25 may be incised to open the vent hole 24. The vent plate 25 may have a notch 25a for inducing the incision.

The negative electrode terminal 21 and positive electrode terminal 22 may pass through the terminal holes H1 and H2 of the cap plate 20 in a state of electrical insulation from the cap plate 20. Insulating members 31 and 32 may be disposed at the terminal holes H1 and H2 of the cap plate 20 to insulate the negative electrode terminal 21 and positive electrode terminal 22 from the cap plate 20.

The insulating members 31 and 32 may be formed of a synthetic resin injected and molded between internal walls of the terminal holes H1 and H2 and the negative and positive electrode terminals 21 and 22 in a state where the negative and positive electrode terminals 21 and 22 are spaced apart from the internal walls of the terminal holes H1 and H2. Accordingly, the insulating members 31 and 32 may be integrally formed by connecting an internal side and an external side of the cap plate 20 at the terminal holes H1 and H2 while electrically insulating the internal walls of the terminal holes H1 and H2 from the negative and positive electrode terminals 21 and 22. The insulating members 31 and 32 may provide simplified insulating and sealing structures between the terminal holes H1 and H2 and the negative and positive electrode terminals 21 and 22.

The terminal holes H1 and H2 may be formed in a step structure, and the insulating members 31 and 32 may be formed to correspond to the step structure of the terminal holes H1 and H2. Accordingly, an adhesive property of the insulating members 31 and 32 molded with an outer peripheral side of the terminal holes H1 and H2 in the cap plate 20 may be enhanced. Accordingly, a property of sealing an electrolyte between the terminal holes H1 and H2 and the insulating members 31 and 32 may be improved.

Figure 5:
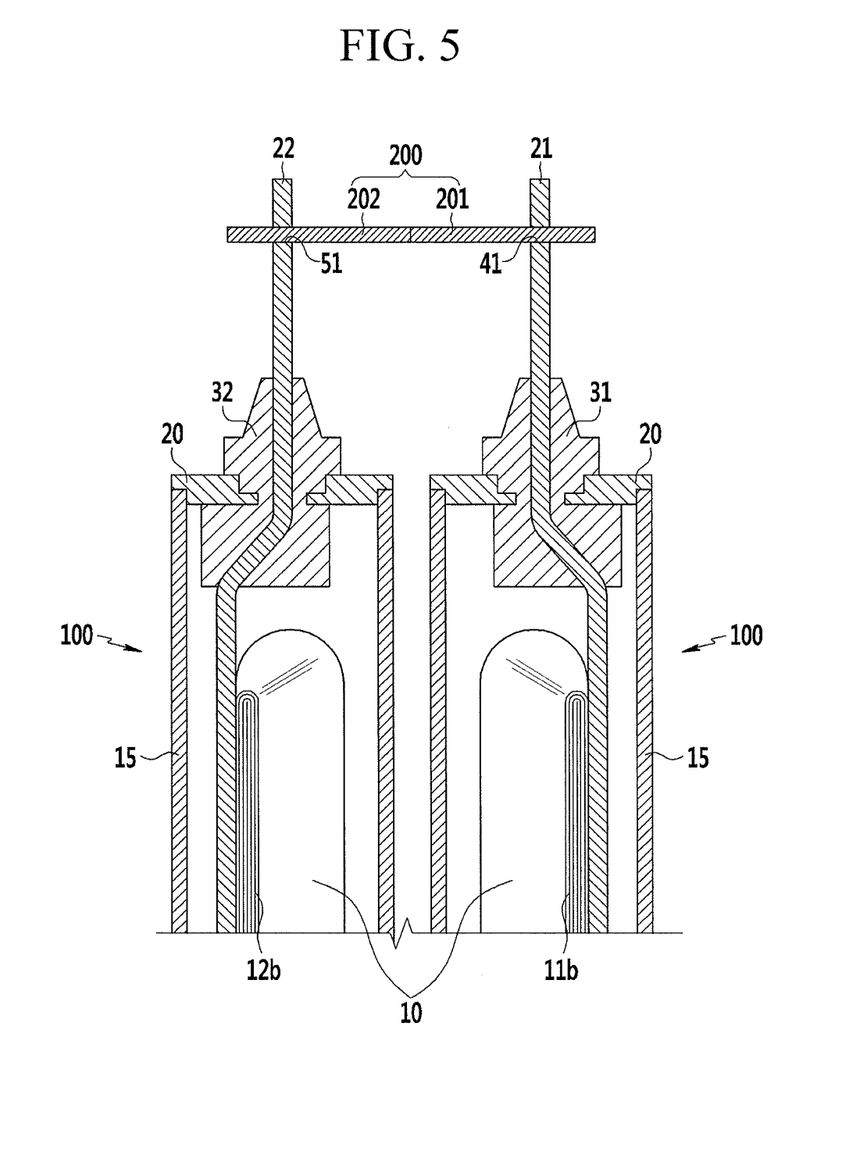
FIG. 5 illustrates a cross-sectional view taken along line V-V of FIG. 4.

The negative and positive electrode terminals 21 and 22 may be buried in the insulating members 31 and 32 inside the case 15 in a curved state (see FIG. 5). Even when external force is applied to the negative and positive electrode terminals 21 and 22 from the outside of the cap plate 20, a connection state of the negative and positive electrode terminals 21 and 22 and the electrode assembly 10 may be firmly maintained. Further, an adhesive property and fastening force of the negative and positive electrode terminals 21 and 22 and the insulating members 31 and 32 may be enhanced. Accordingly, a property of sealing an electrolyte between the negative and positive electrode terminals 21 and 22 and the insulating members 31 and 32 may be improved.

The negative and positive electrode terminals 21 and 22 may be formed in a band shape having a width W and a thickness T. The negative and positive electrode terminals 21 and 22 may be welded to the uncoated portions 11b and 12b of the electrode assembly 10 inside the case 15 while a surface forming a width of the negative and positive electrode terminals 21 and 22 is in close contact with at the uncoated portions 11b and 12b.

The negative and positive electrode terminals 21 and 22 may include fastening portions located outside the cap plate 20. The fastening portion may be variously formed so that at least a part of the bus bar 200 may be inserted therein. The bus bar 200 may be welded while being inserted in the fastening portion. The bus bar 200 may be inserted in the fastening portion so that it is possible to easily weld the negative and positive electrode terminals 21 and 22 and the bus bar 200. The fastening force of the fastening portion and the bus bar 200 in a welded state may be thereby improved.

Figure 4:
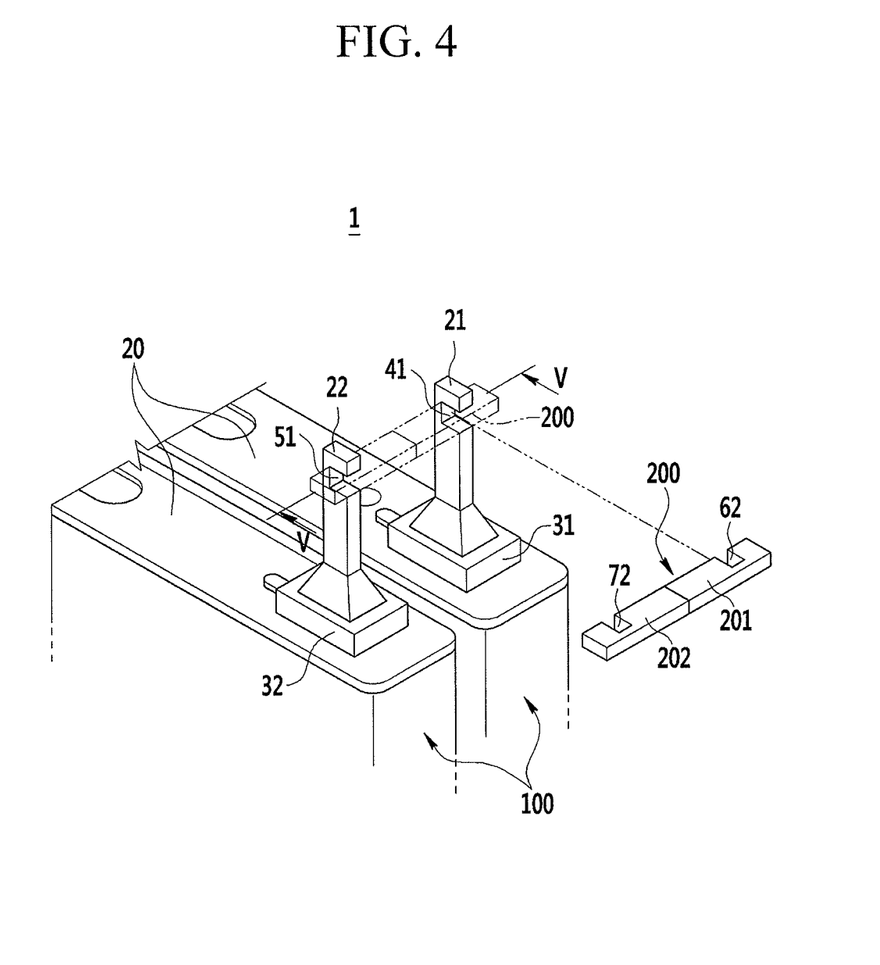
FIG. 4 illustrates an exploded perspective view of an electrode terminal and a bus bar in the rechargeable battery module of FIG. 1.

FIG. 4 is an exploded perspective view of the electrode terminal and the bus bar in the rechargeable battery module 1 of FIG. 1, and FIG. 5 is a cross-sectional view taken along line V-V of FIG. 4. Referring to FIGS. 4 and 5, the negative and positive electrode terminals 21 and 22 are electrically connected to the negative electrode 11 and the positive electrode 12 of the electrode assembly 10 of respective unit cells.

The negative and positive electrode terminals 21 and 22 may be buried in the insulating members 31 and 32 disposed inside respective ones of the cases 15 in a curved state and may lean toward one side of an internal portion of the case 15. The uncoated portions 11b and 12b of the electrode assembly 10 may be disposed while leaning to one side toward the negative and positive electrode terminals 21 and 22 to be welded to the respective one of the negative and positive electrode terminals 21 and 22.

The fastening portions formed in the negative and positive electrode terminals 21 and 22 may be formed as first concave recesses 41 and 52 opened toward one side of the negative and positive electrode terminals 21 and 22 in a width direction. For example, the first concave recesses 41 and 51 may have a structure opened toward external sides of the negative and positive electrode terminals 21 and 22 in a width direction. Herein, the terms "external" and "internal" may be understood with reference to negative and positive electrode terminals 21 and 22 extending from opposite ends of the cap plate 20 in the width direction of the unit cell 100, with the term "external" referring to facing away from the remainder of the unit cell 100, for example, away from the other electrode terminal, and the term "internal" referring to facing toward the remainder of the unit cell 100, for example, toward the other electrode terminal.

The bus bar 200 may include second concave recesses 62 and 72 formed to be matched to the first concave recesses 41 and 51 such that the second concave recesses 62 and 72 may be coupled to the first concave recesses 41 and 51. Accordingly, the bus bar 200 may be coupled to the first concave recesses 41 and 51 of the negative and positive electrode terminals 21 and 22 through the second concave recesses 62 and 72.

The first concave recesses 41 and 51 of the negative and positive electrode terminals 21 and 22 may be coupled to rear sides of the second concave recesses 62 and 72 via the second concave recesses 62 and 72 of the bus bar 200. Further, the second concave recesses 62 and 72 of the bus bar 200 may be coupled to rear sides of the first concave recesses 41 and 51 via the first concave recesses 41 and 51 of the negative and positive electrode terminals 21 and 22. The bus bar 200 may move in a horizontal direction toward the first concave recesses 41 and 51 to be coupled to the negative and positive electrode terminals 21 and 22.

As described above, the negative and positive electrode terminals 21 and 22 and the bus bar 200 may have a strong fastening force due to coupling of the first concave recesses 41 and 51 and the second concave recesses 62 and 72. A welding operation may be easy when laser welding is performed at a portion at which the negative and positive electrode terminals 21 and 22 are in contact with the bus bar 200.

The bus bar 200 may include a first portion 201 and a second portion 202, each being formed of the same material as a respective one of the negative and positive electrode terminals 21 and 22. For example, the first portion 201 of the bus bar 200 may be made of the same material as the negative electrode terminal 21, and the second portion of the bus bar 202 may be made of the same material as the positive electrode terminal 22. The first and second portions 201 and 202 may be used for connecting the negative and positive electrode terminals 21 and 22 in a state in which the first and second portions 201 and 202 are clad welded.

Hereinafter, various other exemplary embodiments will be described. Descriptions that relate to the same configuration as that of the aforementioned exemplary embodiment will not be repeated, and differences in configuration will be described.

Figure 6:
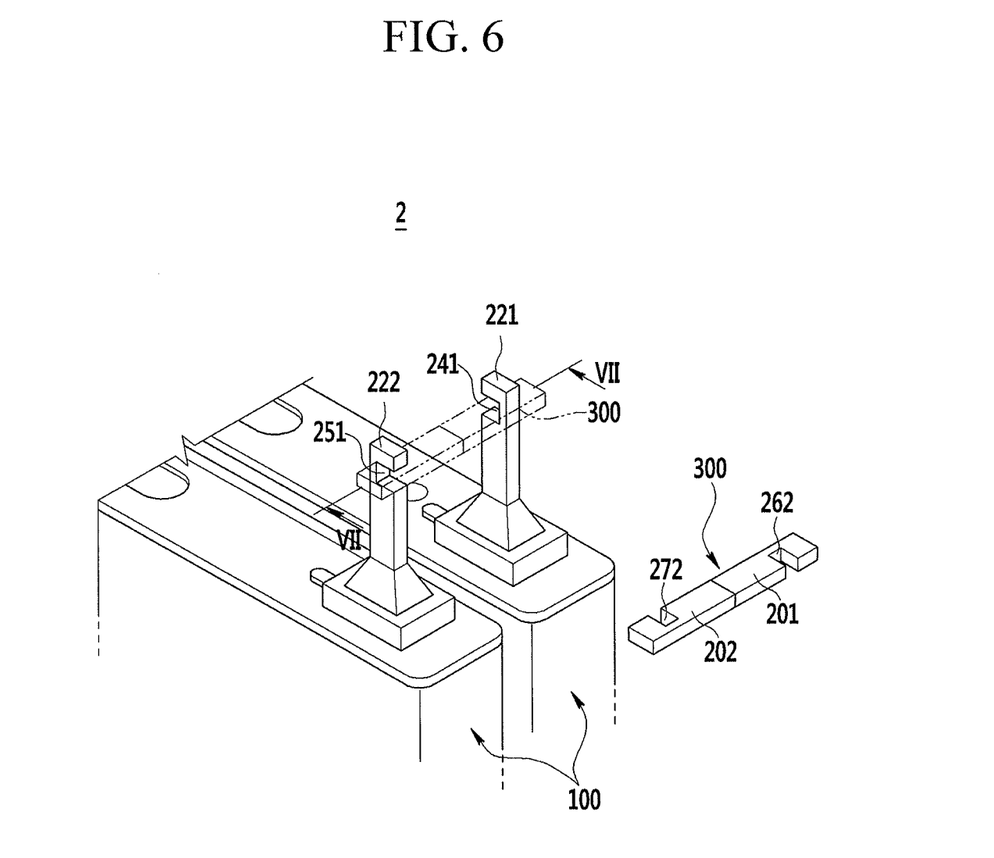
FIG. 6 illustrates an exploded perspective view of an electrode terminal and a bus bar in a rechargeable battery module according to another exemplary embodiment.
Figure 7:
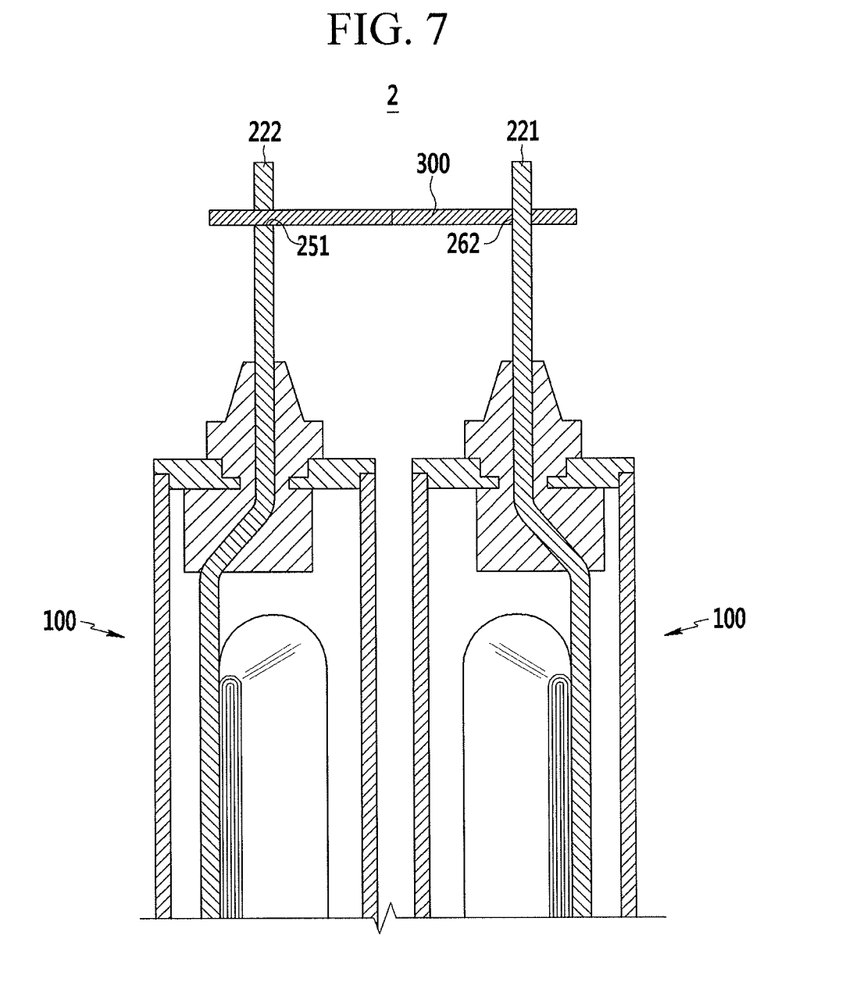
FIG. 7 illustrates a cross-sectional view taken along line VII-VII of FIG. 6.

FIG. 6 is an exploded perspective view of an electrode terminal and a bus bar in a rechargeable battery module 2 according to another exemplary embodiment, and FIG. 7 is a cross-sectional view taken along line VII-VII of FIG. 6.

Referring to FIGS. 6 and 7, in this exemplary embodiment, first and second concave recesses 241 and 251 may include a first internal concave recess 241 and a first external concave recess 251. The first internal concave recess 241 may be formed in a structure opened toward an internal side of the negative electrode terminal 221 in a width direction, and the first external concave recess 251 may be formed in a structure opened toward an external side of the positive electrode terminal 222 in a width direction.

A bus bar 300 may include a second external concave recess 262 and a second internal concave recess 272. The second external concave recess 262 may be formed to be matched and coupled to the first internal concave recess 241. The second internal concave recess 272 may be formed to be matched and coupled to the first external concave recess 251.

The first internal concave recess 241 and the first external concave recess 251 of the negative and positive electrode terminals 221 and 222 may be coupled to rear sides of the second external concave recess 262 and the second internal concave recess 272 via the second external concave recess 262 and the second internal concave recess 272 of the bus bar 300.

Further, the second external concave recess 262 and the second internal concave recess 272 of the bus bar 300 may be coupled to rear sides of the first internal concave recess 241 and the first external concave recess 251 via the first internal concave recess 241 and the first external concave recess 251 of the negative and positive electrode terminals 221 and 222.

The bus bar 300 may be rotated toward the first internal concave recess 241 and the first external concave recess 251 in a horizontal state to be coupled with the first internal concave recess 241 and the first external concave recess 251.

Figure 8:
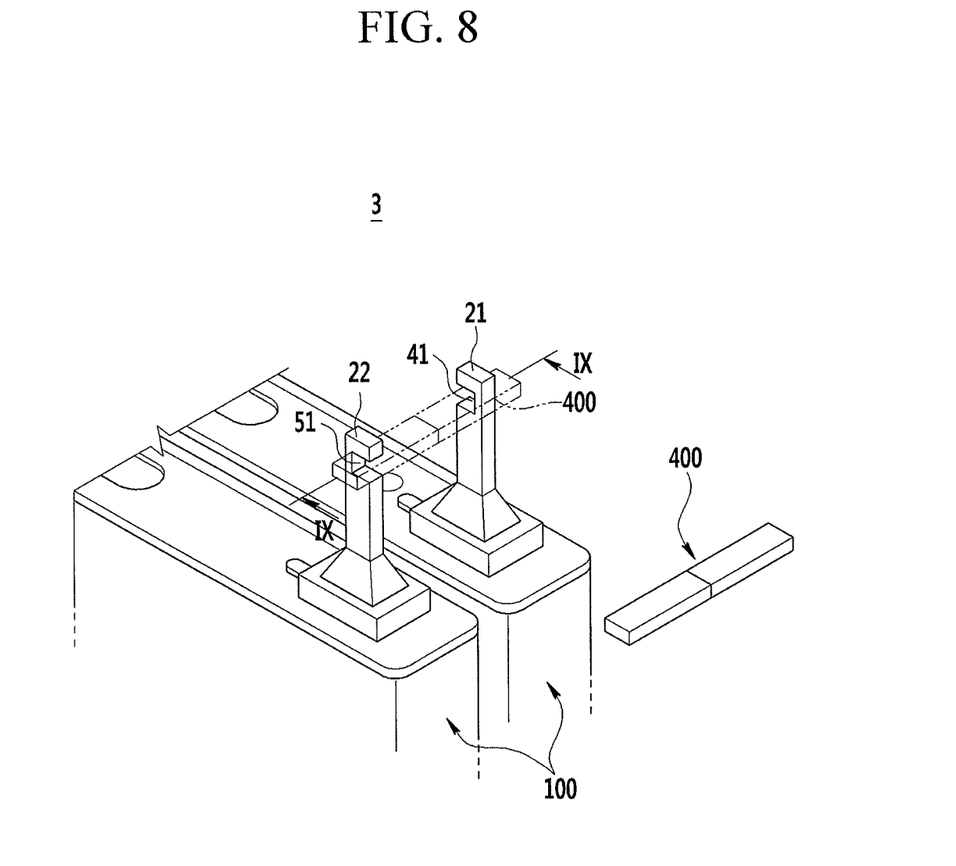
FIG. 8 illustrates an exploded perspective view of an electrode terminal and a bus bar in a rechargeable battery module according to another exemplary embodiment.
Figure 9:
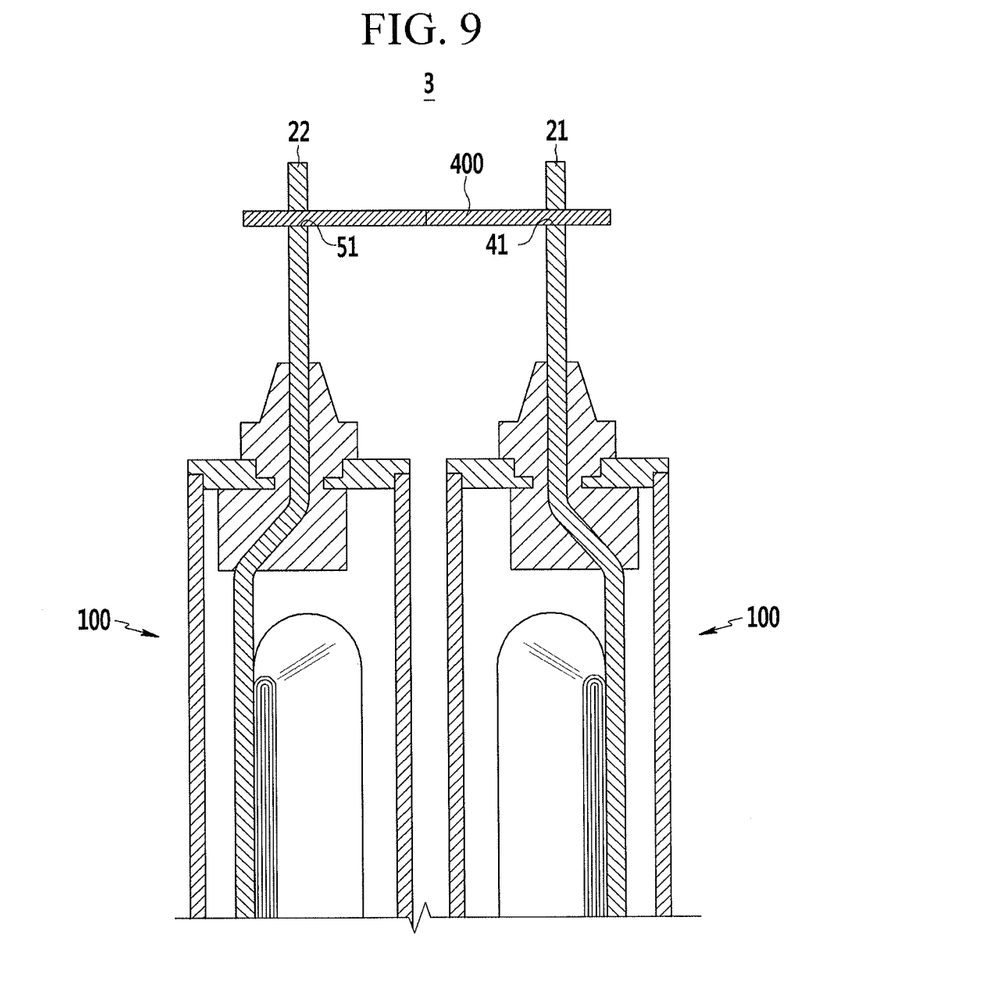
FIG. 9 illustrates a cross-sectional view taken along line IX-IX of FIG. 8.

FIG. 8 is an exploded perspective view of an electrode terminal and a bus bar in a rechargeable battery module 3 according to another exemplary embodiment, and FIG. 9 is a cross-sectional view taken along line IX-IX of FIG. 8.

Referring to FIGS. 8 and 9, the first concave recesses 41 and 51 formed at the negative and positive electrode terminals 21 and 22 in this exemplary embodiment may be the same as those of the exemplary embodiments of FIGS. 6-7, and a bus bar 400 may be formed in a band shape including no second concave recess, differently from the bus bars 200 and 300 of the previous exemplary embodiments.

The bus bar 400 may move toward the first concave recesses 41 and 51 of the negative and positive electrode terminals 21 and 22 in a horizontal direction to be coupled to the first concave recesses 41 and 51 of the negative and positive electrode terminals 21 and 22, or may connect the negative and positive electrode terminals 21 and 22 while sequentially heading the first concave recesses 41 and 51 of the negative and positive electrode terminals 21 and 22.

Compared to the previous embodiments, the bus bar 400 may be more easily coupled to the first concave recesses 41 and 51 of the negative and positive electrode terminals 21 and 22 in this exemplary embodiment.

Figure 10:
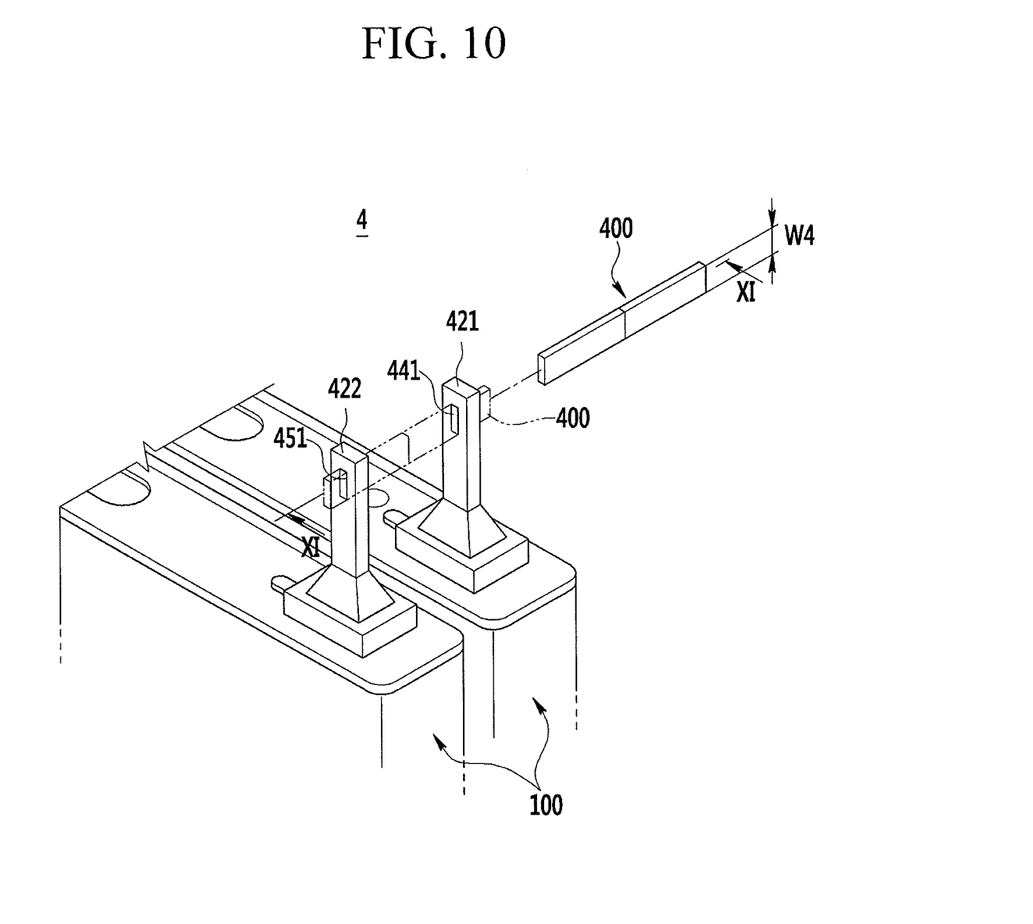
FIG. 10 illustrates an exploded perspective view of an electrode terminal and a bus bar in a rechargeable battery module according to another exemplary embodiment.
Figure 11:
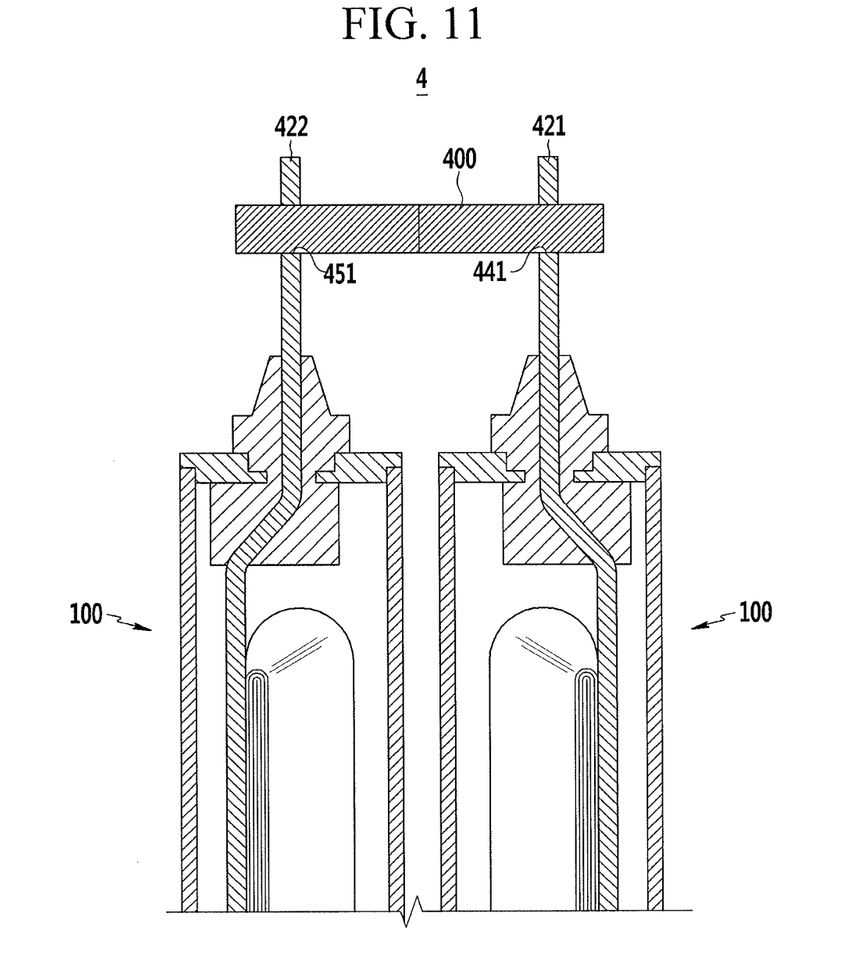
FIG. 11 illustrates a cross-sectional view taken along line XI-XI of FIG. 10.

FIG. 10 is an exploded perspective view of an electrode terminal and a bus bar in a rechargeable battery module 4 according to another exemplary embodiment, and FIG. 11 is a cross-sectional view taken along line XI-XI of FIG. 10.

Referring to FIGS. 10 and 11, the bus bar 400 in this exemplary embodiment is the same as the bus bar 400 of the exemplary embodiment of FIGS. 8 and 9. The negative and positive electrode terminals 421 and 422 may include insertion openings formed as through-openings 441 and 451.

The through-openings 441 and 451 may be formed to pass through centers of the negative and positive electrode terminals 421 and 422 in a width direction. The bus bar 400 may connect the negative and positive electrode terminals 421 and 422 while sequentially passing through and being inserted in the through-openings 441 and 451.

Compared to the previous exemplary embodiments, in this exemplary embodiment, the bus bar 400 may be easily coupled to the through-openings 441 and 451 of the negative and positive electrode terminals 421 and 422, and it may be possible to minimize electrical resistance between the bus bar 400 and the negative and positive electrode terminals 421 and 422 by securing a sufficient width W4 according to heights of the negative and positive electrode terminals 421 and 422.

By way of summation and review, a rechargeable battery module may be configured by connecting the electrode terminals of unit cells formed of the rechargeable battery through a bus bar. For example, the bus bar may be connected to the electrode terminal by welding. The electrode terminal and the bus bar may not have a mutual fastening force and positions thereof may not be fixed before welding. Accordingly, it may be difficult to perform a welding operation and a mutual fastening force may be weak.

In contrast, embodiments may provide a rechargeable battery enabling a bus bar to be easily connected to an electrode terminal, and a fastening force between an electrode terminal and a bus bar may be improved.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope thereof as set forth in the following claims.

What is claimed is:

1. A rechargeable battery, comprising:
   an electrode assembly that performs charging and discharging;
   a case in which the electrode assembly is located;
   a cap plate coupled to an opening of the case; and
   electrode terminals located in the cap plate and insulated from the cap plate by insulation members located at terminal holes of the cap plate, the electrode terminals being connected to electrodes of the electrode assembly and extending outside the cap plate and the electrode terminals including a fastening portion that receives at least a part of a bus bar to be welded, the fastening portion includes a concave recess that is open toward one side of the electrode terminal in a width direction.

2. The rechargeable battery as claimed in claim 1, wherein:
   each electrode terminal of the electrode terminals is in a form of a band having a width and a thickness, each electrode terminal being welded to an uncoated portion of the electrode assembly inside the case by welding, and each electrode terminal including the fastening portion outside the case.

3. The rechargeable battery as claimed in claim 1, wherein:
   the electrode terminals include a negative electrode terminal connected to a negative electrode of the electrode assembly and including a negative electrode terminal concave recess and a positive electrode terminal connected to a positive electrode of the electrode assembly and including a positive electrode terminal concave recess, the negative electrode terminal concave recess is open toward an external side of the negative electrode terminal in the width direction, and the positive electrode terminal concave recess is open toward an external side of the positive electrode terminal in the width direction.

4. The rechargeable battery as claimed in claim 1, wherein:

the electrode terminals include a negative electrode terminal connected to a negative electrode of the electrode assembly and including a negative electrode terminal concave recess and a positive electrode terminal connected to a positive electrode of the electrode assembly and including a positive electrode concave recess, the concave recess of the negative electrode terminal is open toward an internal side of the negative terminal in a width direction, and the concave recess of the positive electrode terminal is open toward an external side of the positive electrode terminal in a width direction.

5. The rechargeable battery as claimed in claim 1, wherein each of the insulating members includes a synthetic resin that is molded such that a respective one of the electrode terminals is spaced apart from an inside of a respective one of the terminal holes.

6. A rechargeable battery module, comprising:

a plurality of unit cells of rechargeable batteries, each of the unit cells including electrode terminals protruding outside of a cap plate; and a bus bar connecting the electrode terminals of the unit cells, each of the electrode terminals including a fastening portion located at an outside the cap plate, and at least a part of the bus bar being in an inserted state in the fastening portion of each of the electrode terminals to be welded, each fastening portion includes a first concave recess opened toward one side of the electrode terminal in a width direction, and the bus bar is coupleable to the first concave recess to be welded.

7. The rechargeable battery module as claimed in claim 6, wherein:

each of the electrode terminals is in a form of a band having a width and a thickness, each electrode terminal being welded to an uncoated portion of an electrode assembly inside a case, and each of the electrode terminals including the fastening portion outside the case.

8. The rechargeable battery module as claimed in claim 6, wherein:

the electrode terminals of each of the unit cells include a negative electrode terminal connected to a negative electrode of the electrode assembly and including a negative electrode terminal first concave recess and a positive electrode terminal connected to a positive electrode of the electrode assembly and including a positive electrode terminal first concave recess, the negative electrode terminal first concave recess is opened toward an external side of the negative electrode terminal in the width direction, the positive electrode terminal first concave recess is opened toward an external side of the positive electrode terminal in the width direction, and the bus bar includes second concave recesses that are coupleable with the negative electrode terminal first concave recess of one of the unit cells and the positive electrode terminal first concave recess of another one of the unit cells.

9. The rechargeable battery module as claimed in claim 6, wherein:

the electrode terminals of each of the unit cells include a negative electrode terminal connected to a negative electrode of the electrode assembly and including a negative electrode terminal first concave recess and a positive electrode terminal connected to a positive electrode of the electrode assembly and including a positive electrode terminal first concave recess, the negative electrode terminal first concave recess is opened toward an internal side of the negative electrode terminal in the width direction, the positive electrode terminal first concave recess is opened toward an external side of the positive electrode terminal in the width direction, and the bus bar includes a second external concave recess coupleable with the negative electrode terminal first concave recess of one of the unit cells and a second internal concave recess coupleable with the positive electrode terminal first concave recess of another one of the unit cells.

10. The rechargeable battery module as claimed in claim 6, wherein:

the electrode terminals of each unit cell include a negative electrode terminal connected to a negative electrode of an electrode assembly and including a negative electrode terminal concave recess and a positive electrode terminal connected to a positive electrode of the electrode assembly and including a positive electrode terminal concave recess, and the bus bar includes:

a first portion formed of a same material as that of the negative electrode terminal and connectable to the negative electrode terminal of one of the unit cells; and a second portion formed of a same material as that of the positive electrode terminal and connectable to the positive electrode terminal of another one of the unit cells, the first portion and the second portion being connected by clad welding.

* * * * *